US006836512B2

(12) United States Patent
Van Der Schaar et al.

(10) Patent No.: US 6,836,512 B2
(45) Date of Patent: Dec. 28, 2004

(54) SPATIAL SCALABILITY FOR FINE GRANULAR VIDEO ENCODING

(75) Inventors: Mihaela Van Der Schaar, Ossining, NY (US); Mahesh Balakrishnan, Foster City, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 658 days.

(21) Appl. No.: 09/975,626

(22) Filed: Oct. 11, 2001

(65) Prior Publication Data

US 2002/0071486 A1 Jun. 13, 2002

Related U.S. Application Data

(60) Provisional application No. 60/239,347, filed on Oct. 11, 2000.

(51) Int. Cl.[7] .................................................. H04N 7/12
(52) U.S. Cl. ............................. 375/240.11; 375/240.19
(58) Field of Search ....................... 375/240.02, 240.08, 375/240.11, 240.18, 240.19, 240.2, 240.21; 382/236–237, 238, 240, 248; 348/398.1, 397.1, 399.1, 408.1, 424.1

(56) References Cited

U.S. PATENT DOCUMENTS

| | | | | |
|---|---|---|---|---|
| 5,742,892 A | * | 4/1998 | Chaddha | 725/146 |
| 6,556,719 B1 | * | 4/2003 | Monro | 382/248 |
| 6,580,754 B1 | * | 6/2003 | Wan et al. | 375/240.01 |
| 6,580,834 B2 | * | 6/2003 | Li et al. | 382/251 |
| 6,639,943 B1 | * | 10/2003 | Radha et al. | 375/240.11 |

OTHER PUBLICATIONS

Wu et al, "DCT–prediction based progressive fine granularity scalable coding", International Conference on Image Processing, IEEE, vol. 3, pp.556–559, Sep. 10–13, 2000.*
Li et al, "Fine granularity scalability in MPEG–4 for streaming video", IEEE International Symposium on Circuits and Systems, vol. 1, pp.299–302, May 28–31, 2000.*

* cited by examiner

*Primary Examiner*—Vu Le

(57) ABSTRACT

A method and system for high resolution formatting of video images and dynamically adjusting the transmission resolution of the high-resolution images is presented. The method first downscales the high-resolution images and encodes the downscaled images into base layer frames. Quality enhancement layer data is generated from the downscaled video images and the encoded data contained in corresponding base layer frames. The quality enhancement layer data is encoded into quality enhancement layer frames. The data contained in the base layer frames and corresponding quality layer frames are then upscaled and spatial scalability data is determined from the upscaled data and the original image. The spatial scalability data is then encoded into spatial scalability data. During transmission of the encoded video image, each available encoded frame is transmitted using different amounts or portions of the enhancement layers so as to occupy the available bandwidth.

46 Claims, 8 Drawing Sheets

SPATIAL SCALABILITY FOR FINE GRANULAR VIDEO ENCODING

BENEFIT OF EARLIER FILING DATE

This application claims the benefit of provisional patent application Ser. No. 60/239,347, entitled "SPATIAL SCALABILITY WITH FGS, filed on Oct. 11, 2000, the entirety of which is hereby incorporated by reference.

RELATED APPLICATION

This application is related to commonly assigned:

U.S. patent application Ser. No. 09/930,672, entitled "Totally Embedded FGS Video Coding with Motion Compensation", filed Aug. 15, 2001; U.S. patent application Ser. No. 09/887,743, entitled "Double Loop Fine Granular Scalability", filed on Jun. 21, 2001; U.S. patent application Ser. No. 09/887,756, entitled "Single Loop Fine Granular Scalability", filed on Jun. 21, 2001.

FIELD OF THE INVENTION

This invention relates generally to video encoding and more specifically to spatial, or resolution, scalability for fine granular scalability encoded video signals.

BACKGROUND OF THE INVENTION

The flexibility of a Fine-Granular Scalability (FGS) video encoding enables it to support a wide range of transmission bandwidths as is described in U.S. patent application Ser. No. 09/347,882, entitled "System and Method for Improved Fine Granular Scalable Video Using Base Layer Coding Information" filed on Jul. 6, 1999, and assigned to the assignee herein. An improved FGS video encoding method is disclosed in U.S. patent application Ser. No. 09/590,825, entitled "Hybrid Temporal-SNR Fine Granular Scalability Video Coding," filed on Jun. 9, 2000 and assigned to the assignee herein. In the hybrid temporal-SNR FGS video encoding method disclosed, an encoder is operable to encode and transmit video images with improved quality, referred to herein as SNR, FGS encoded form, or with improved temporal form or in a combined hybrid temporal-SNR FGS form.

However, in the current FGS framework there is no ability to alter the image resolution (i.e., spatial scalability) to conform to different resolutions, such as QCIF or CIF. The addition of spatial scalability to FGS encoding would be advantageous as the current FGS encoding system limits the transmission bandwidth range due to the predefined spatial resolution at encoding time. Since variable bandwidth networks, such as the Internet, have bandwidths, or bit rates, that vary widely and are generally unknown at encoding time, the current system does not adapt to the varying bandwidth and, hence, is not adequate for variable bandwidth network video transmission.

Hence, there is a need for a spatial scalability structure with the current FGS encoding system that allows for a wider range of transmission bit rates to be satisfied.

SUMMARY OF THE INVENTION

A method for coding video data to allow for scalability of image resolution comprising downscaling the video data image frames, encoding the downscaled video data to produce base layer frames, generating quality enhanced residual images from the downscaled video data and said encoded data in said base layer frame, encoding said quality enhanced residual images using a fine granular coding technique to produce quality enhancement frames, upscaling the encoded data contained in the base layer frames and corresponding quality enhanced residual frames, generating a first set of residual images from the upscaled base layer, and corresponding quality enhancement layer frame data and the video data, encoding this first set of residual images using a fine granular coding technique to produce spatial enhancement frames. In another aspect of the invention, a second temporal enhancement frame information is produced from among the information contained in the encoded spatial enhancement layer frames.

Figure 1:
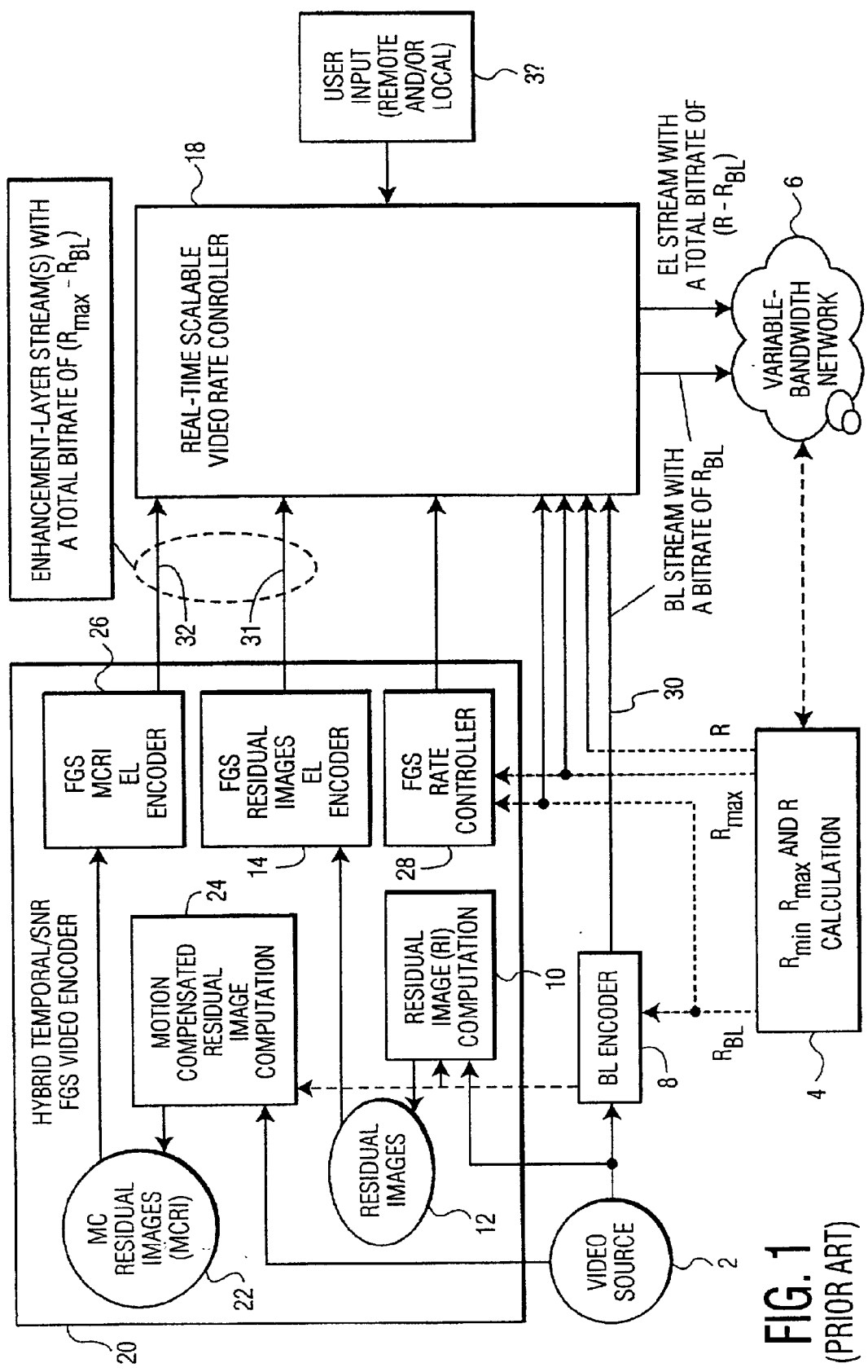
FIG. 1 depicts a conventional FGS encoding system.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 illustrates system 100 for encoding video images in a hybrid temporal-SNR FGS encoding structure. System 100 receives video images from video source 2 and transmits encoded video images across variable bandwidth network 6. As will be appreciated, video source 2 can be embodied by any type of video capturing device, such as television camera, video recorder/playback, analog or digital, etc., and the variable bandwidth network, may be a landline network, such as the Internet, a point-to-point network, such as the telephone network, or a wireless network, such as a satellite channel or a mobile receiving device, such as a cellular phone or computer.

Encoder 110 is composed principally of a base layer (BL) encoder 8, a hybrid temporal-SNR FGS video encoder 20 and video rate controller 18. Base layer encoder 8, which is described in the earlier referenced applications, encodes received video images into a base layer data stream. The encoded base layer represents a level of encoding that is representative of a minimally acceptable video image and is guaranteed to be transmitted over network 6. FGS layer encoder 20, which is described in the earlier referenced applications, encodes residual images generated between the input video images and base layer encoded images of the input video images into a video enhancement layer. The video enhancement layer is used to improve the quality of an image produced by the encoded base layer. Rate controller 18 determines the rate of transmission of the base layer and enhancement layer, and consequently the number of bits that can be transmitted, depending upon, for example, available bandwidth and user preference. User preference can be input to controller 18 by user input 3.

As illustrated, video data from video source 2 is input to both BL encoder 8 and hybrid temporal-SNR FGS video encoder 20. BL encoder 8 encodes an original video image using a conventional frame-prediction coding technique and compresses the video data at a predetermined bit-rate, represented as $R_{BL}$. Calculation block 4 sets $R_{BL}$ to a value between a minimum bit rate ($R_{min}$) and a maximum bit rate (R). In most cases $R_{BL}$ is set to Rmin to ensure even at lowest bandwidths, network 6 will be able to accommodate the video data coded by base layer encoder 8.

The original video data from source 2 and the coded video data (i.e., base layer encoded image) provided by BL encoder 8 are further provided to both a residual image (RI) computation block 10 and motion compensated residual image (MCRI) computation block 24 in hybrid encoder 20. RI computation block 10 and MCRI computation block 24 process the original video data and the coded video data to generate residual images 12 and motion compensated (MC) residual images 22, respectively. Residual images 12 are generated based on a difference between the pixels in this decoded video data and the corresponding pixels in the original video data. The MCRI computation block 24 receives coded video data from BL encoder 8 and also decodes this encoded video data. The MC residual images 22 are generated based on a motion-compensation approach from the decoded video data.

As a result of the above hybrid coding, two streams of enhancement layer frames are produced; a temporal enhancement stream 32, referred to herein as FGST encoded, and an enhancement stream 31, referred to herein as FGS encoded. The FGST encoded enhancement steam 32 includes the compressed FGS temporal frames from the MCRI EL encoder 26 while the FGS encoded enhancement stream 31 includes the SNR, i.e., standard FGS residual, frames from residual image encoder 14. Video encoded streams 31, 32 can be transmitted independently or combined to produce a single enhancement layer stream.

Figure 2:
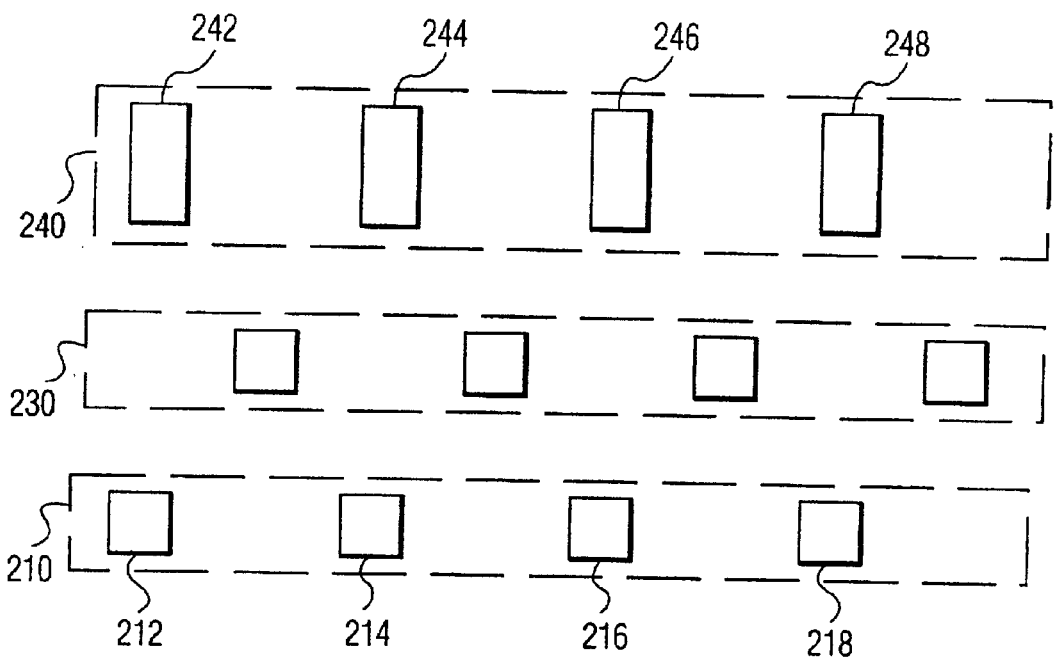
FIG. 2 illustrates hybrid temporal-SNR FGS video encoded structures.

FIG. 2 illustrates one exemplary example of a hybrid temporal-SNR FGS scalability structure achievable with encoder 110 illustrated in FIG. 1. A base layer 210 includes, as "I" frames and "P" frames, which are represented in this illustrative example, as "I" frame 212, and "P" frames, 214, 216, 218, etc. "I" frame 212 is representative of encoded video image data and "P" frames 214, 216, 218, etc., are representative of predicated data frames. In this illustrated example, there is a single "I" frame for a plurality of "P" frames. However, it will be appreciated at that the number "I" frames and "P" frames may vary as the content of the encoded images varies.

Also illustrated are quality (FGS) enhancement layer 240 and temporal (FGST) enhancement layer 230, which, as previously described, are used to achieve quality and temporal scalability, respectively, of an original video image. In this case, temporal FGST layer 230 is used to add temporal enhancement to the encoded information in "I" frame 212 and "P" frames 214, 216, 218, etc., contained in base-layer 210 and FGS layer 240 is used to add quality improvement to the encoded video images in base layer 210 frames and temporal enhancement layer 240 frames.

In this illustrative example, the encoded "I" frame 212 and "P" frames 214, 216, 218, etc., contained in base layer 210. "P" frames 214, 216, 218, etc. contain residual information between the original video image and "I" frame 212. FGS enhancement layer 240 and FGST enhancement layer 230 frames are further shown in an alternating sequence. In this case, the frame data in FGST layer block 232, for example, are predicted from encoded data in base layer frames 212, and 214, as is well known in the art. In this case, frames within base layer 210 and FGST layer 230 are transmitted in alternating manner.

Figure 3:
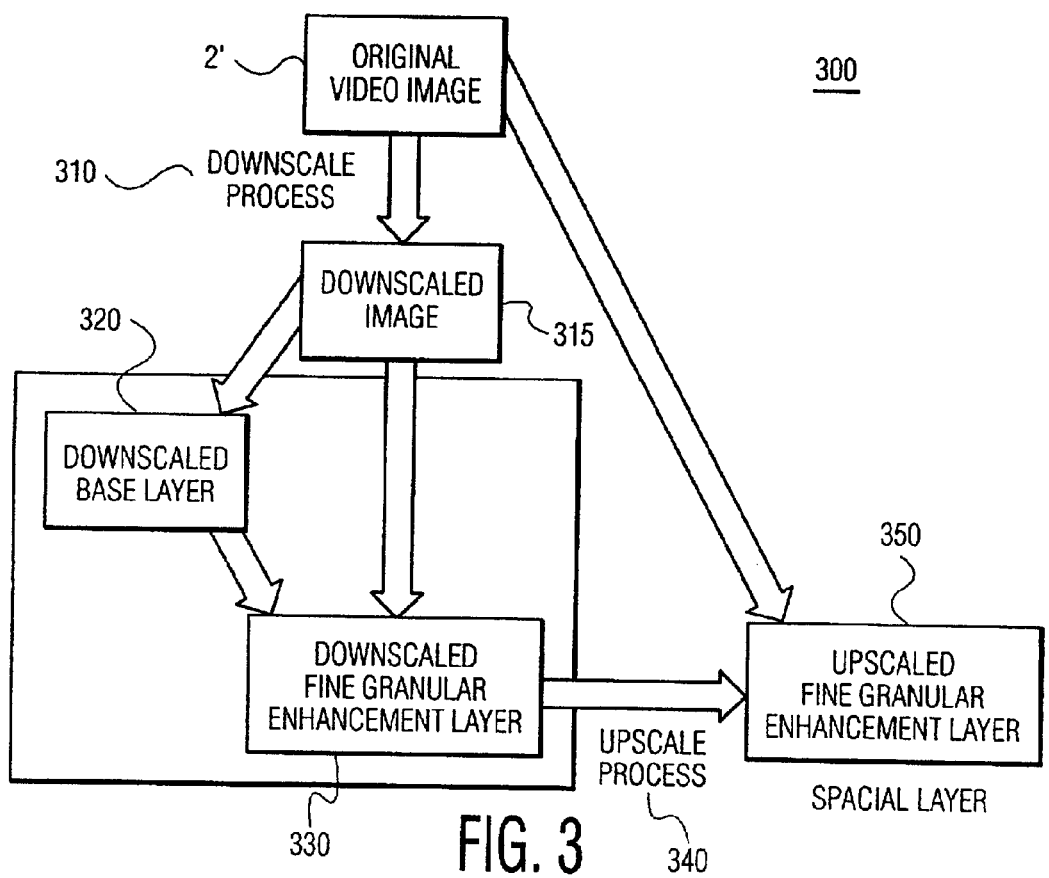
FIG. 3 illustrates an exemplary video image encoding process in accordance with the principles of the invention.

FIG. 3 illustrates an exemplary processing flow 300 in accordance with the principles of the invention. In this exemplary flow, video images 2' are representative of high-resolution images. Video images 2' are first downscaled using well known a downscaling process 310, to a much lower resolution. The downscaled video images 315 are then encoded into a base layer 320 and an enhancement layer 330 using FGS encoding. More specifically, downscaled video image 2' is encoded into base layer 320, which is representative of a minimally acceptable video image. Residual layer 330 is then created from the original downscaled image 315 and corresponding image base layer 320.

The original image is next reconstructed by first upscaling the encoded base layer and enhancement layer using a well known upscale process 340. A residual enhancement layer is then created using the reconstructed-upscaled video image and the original video image 2'. The residual is FGS encoded and is used to adapt the image transmission to satisfy varying network bandwidth and resolution constraints.

Figure 4A:
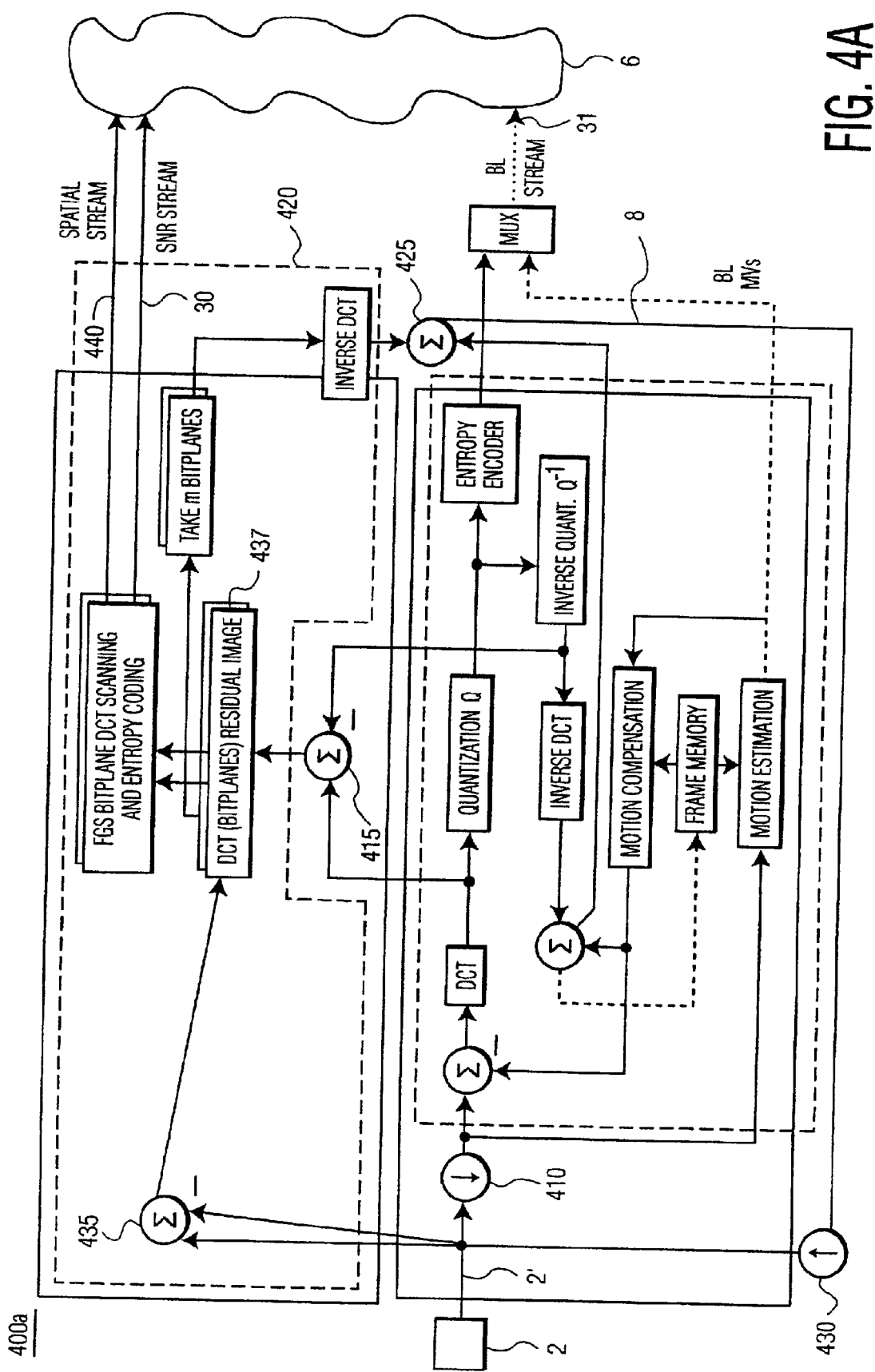
FIG. 4a illustrates an exemplary spatial encoder in accordance with the principles of the invention.

FIG. 4a illustrates a block diagram of a spatial FGS encoding system in accordance with the principles of the invention. In this encoding system high-resolution video images 2' from video source 2 are provided to resolution downscaler 410, and spatial encoder 430. Method used in downscaler 410 for downscaling high-resolution image are well known in the art. For example, high-resolution images of 1024×768 pixels may be downscaled by 352×488 pixels, i.e., CIF format, by selecting every third pixel row and column. Another technique may average the pixels within a square matrix block of a known number of pixels, e.g., 3×3 matrix.

The downscaled image is next provided to a base layer encoder 8 to generate a downscaled base layer. The downscaled base layer and a reconstructed downscaled image are combined using summer 415 and provided to enhancement encoder 420. Enhancement layer encoder 420 determines a quality, a temporal, a spatial or a combined quality/temporal/spatial enhancement layer. The output of encoder 420 is represented as the SNR stream 30 and spatial stream 440.

A reconstructed image based on the base layer/quality enhancement layer image is produced by summer 425 and upscaler 430. Subtractor 435 then determines the difference, i.e., residual, between original image 2' and the reconstructed image based on the upscaled base/quality enhancement layer image. The residual of the upscaled image base/quality layer and the output of summer 415 are provided to formatter 437 for formatting into bitplanes. The images, formatted into bit planes, are input to FGS encoder 439 to transmission as SNR enhancement layer 30 or spatial enhancement layer 440 over network 6.

Figure 4B:
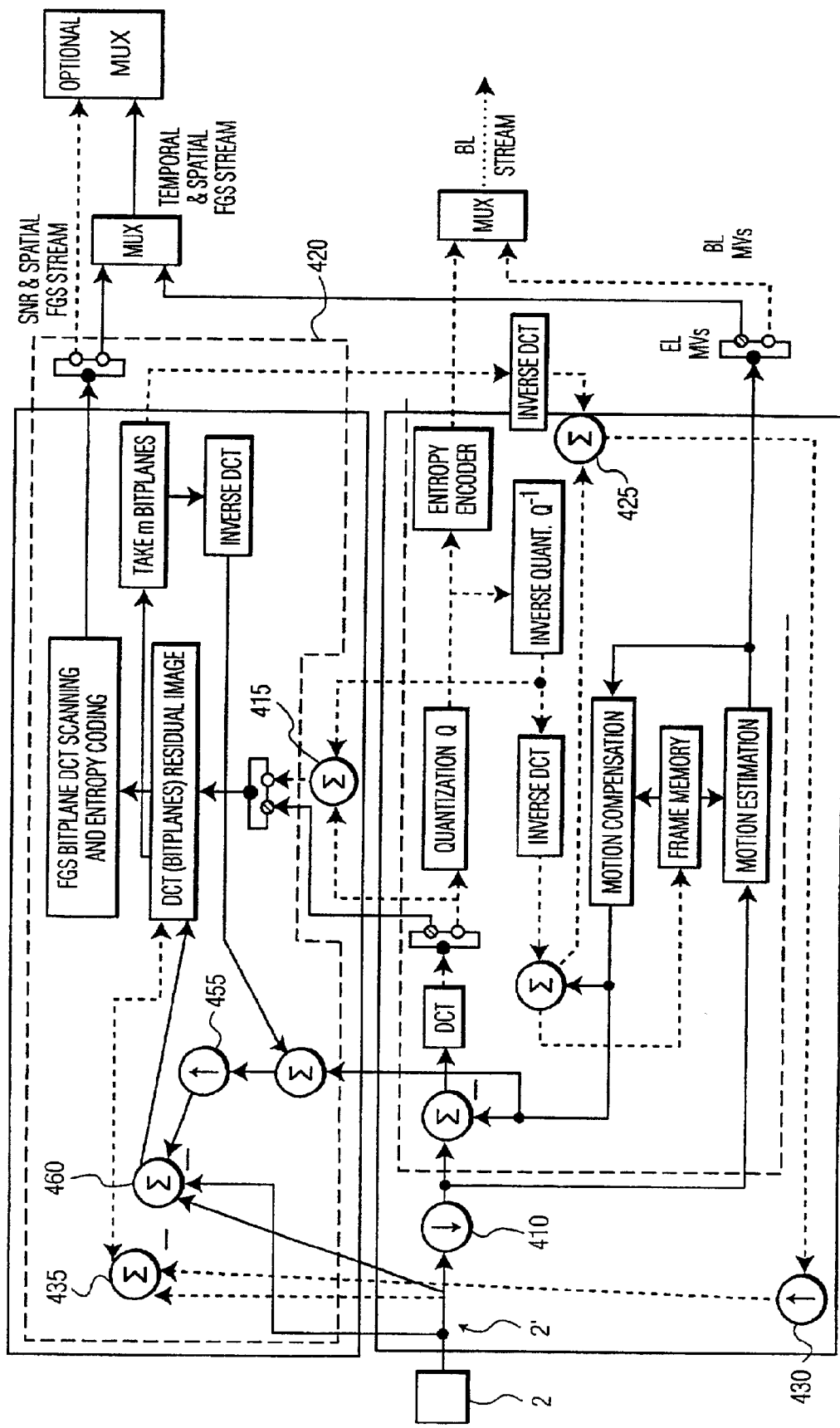
FIG. 4b illustrates a second exemplary spatial encoder in accordance with the principles of the invention.

FIG. 4b illustrates a second exemplary encoder in accordance with the principles of the present invention. In this embodiment a second subtractor 460 is incorporated into temporal/spatial encoder 420 to determine another residual layer that is representative of a temporal layer of a spatial layer. It would be understood by those skilled in the art that the operation of the encoder illustrated in FIG. 4b is similar to that illustrated in FIG. 4a.

Figure 5:
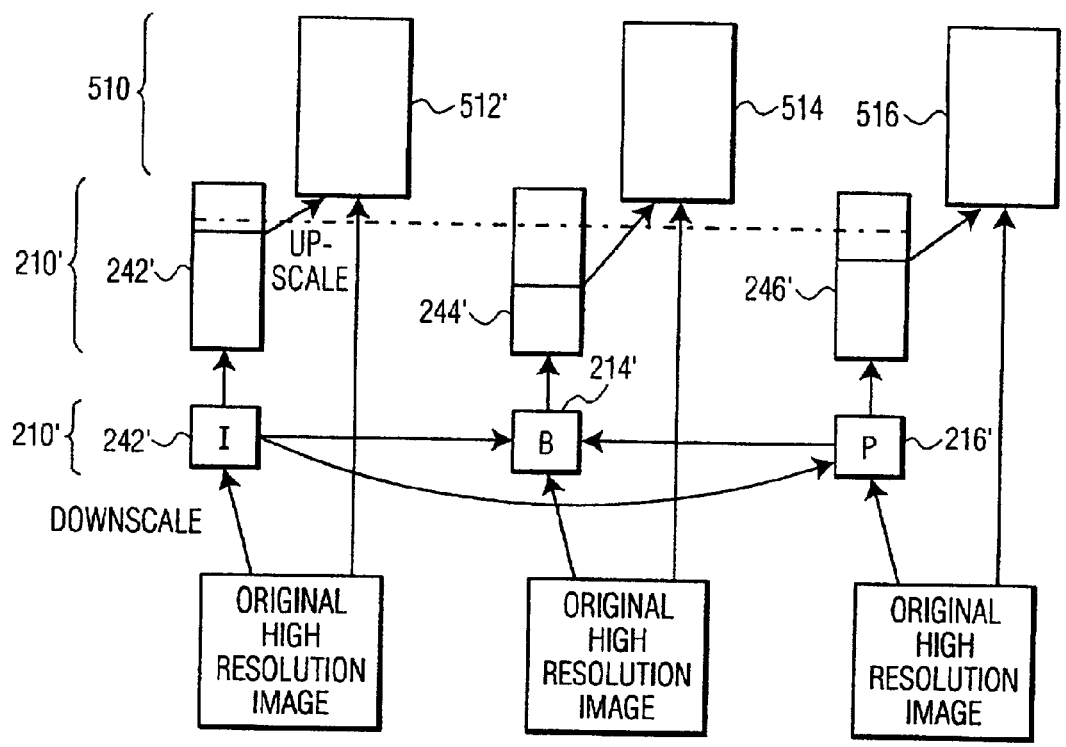
FIG. 5 illustrates a first exemplary spatial-SNR FGS video encoded structure developed using the encoding system illustrated in FIG. 4b.

FIG. 5 illustrates an exemplary embodiment of spatial scalability structural in accordance with the principles of the encoder illustrated in FIG. 4a. In this embodiment, original video signal 2' is first downscaled to a lower resolution, or image size, and encoded in a base layer 210' using known encoding methods, preferably FGS encoding. In this case, base layer frames 212', 214', 216', etc. are coded up to a bit rate (or bandwidth) $R_{BI}$, which is less than the minimum bit rate, $R_{min}$. SNR enhancement layer 240' frames 242', 244', 246', etc. are generated from the residual signal of the downscaled video image and base layer frames. SNR enhancement frames are coded until a known available bandwidth, R'.

A high resolution enhancement layer 510, i.e., spatial layer, is then created from the upscaled low resolution base layer 210' and a portion of the enhancement layer 240' and original high resolution image 2'. Spatial layer frames 512, 514, 516, etc. are encoded for the remainder of the maximum available bandwidth, $R_{max}$. In an alternate embodiment layer 510 could directly predicted from base layer 210'.

The spatial scalability illustrated in FIG. 5 is advantageous as it can extend the range of transmission bit rates since various resolutions can be transmitted. Thus, standard FGS encoding can encode video images with a bit rate in the interval $R_{min}$ to R', as previously discussed, and spatial scalability can extend the bit rate to $R_{max}$ from $R_{min0}$. Spatial scalability can reduce the minimum bandwidth as the downscaled base layer has a reduced number of pixels, and bits, that must be transmitted. Accordingly, high-resolution images, may be downscaled and transmitted at CIF resolution, i.e., 352×288 pixels, when 56 k modems are used to receive the transmitted image, or may be transmitted using CCIR quality, i.e., 426×576 pixels over a higher speed data link. Transmission of images having higher resolutions is achievable using for example, Digital Subscriber Lines (DSL) or cable modems.

Figure 6:
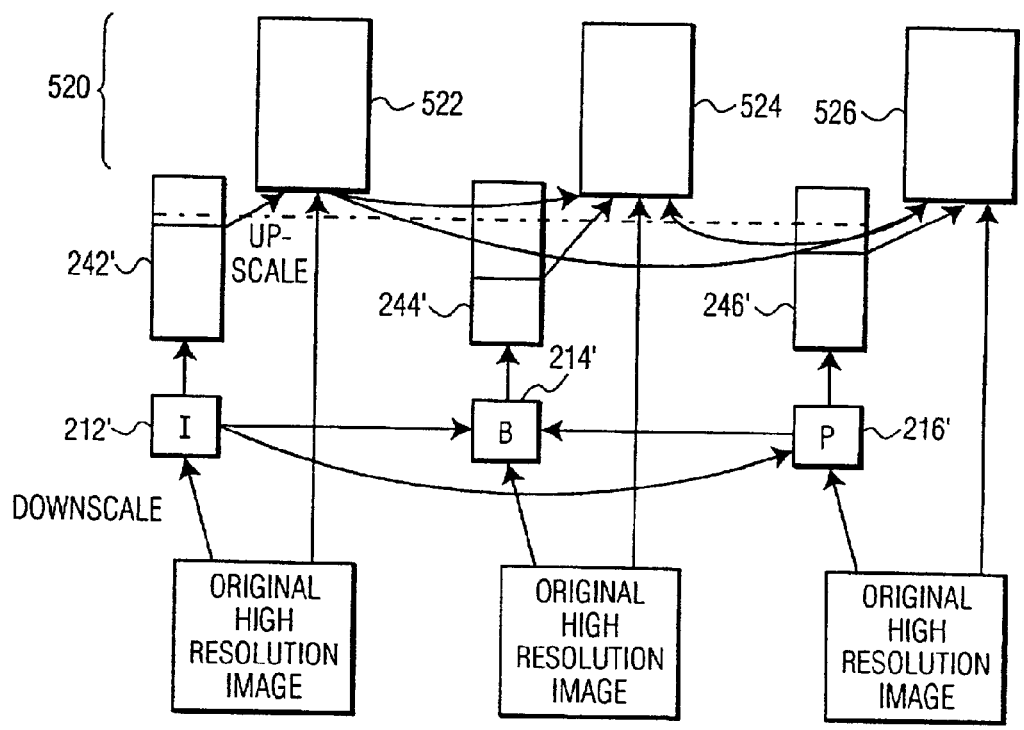
FIG. 6 illustrates a second exemplary spatial-SNR FGS video encoded structure developed using the encoding system illustrated in FIG. 4b.

FIG. 6 illustrates another embodiment of spatial scalability that includes motion compensation performed on the high-resolution images. More specifically, spatial layer 520, in a manner similar to that previously discussed with regard to FIG. 5, and spatial layer frames 522, 523, 524, etc., are motion compensated by using video information items contained in the high-resolution enhancement layer frames. In this illustrative example, motion compensation is performed on frame 526, for example, by using video data from previous frames, 522, 524, and subsequent frames, 528 (not shown). Motion compensation of encoded enhancement layer data is more fully described in the related patent applications and need not be discussed further herein.

Figure 7:
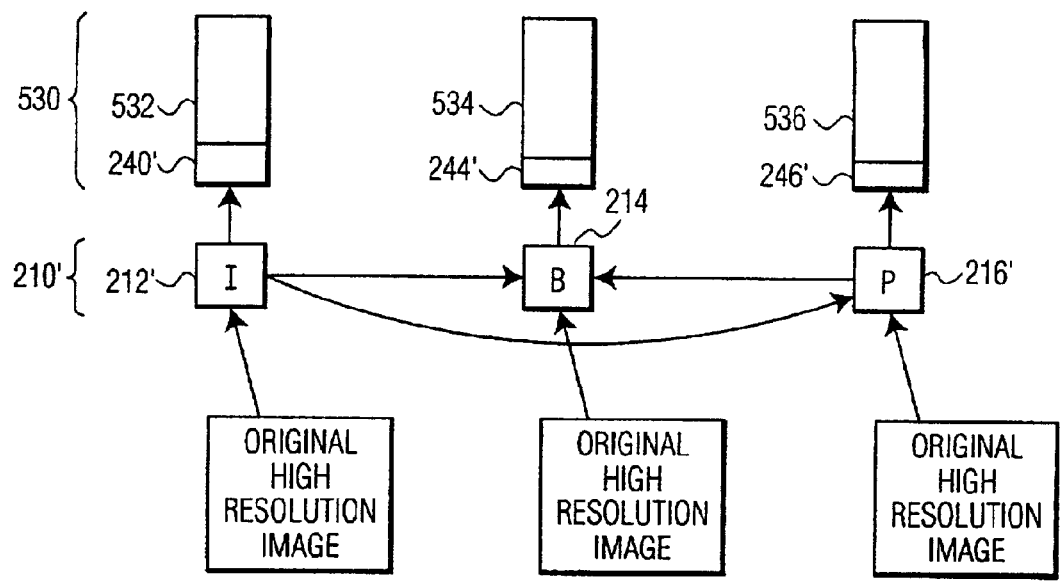
FIG. 7 illustrates an exemplary hybrid spatial-temporal-SNR FGS video encode structure developed using the encoding system illustrated in FIG. 4b.

FIG. 7 illustrates another aspect of the present invention, wherein image 2' is encoded such that base layer 210' includes lower frequency elements of a video image and SNR enhancement layer 240' and spatial enhancement layer 530 include higher frequency elements of a video image. In this embodiment, low frequency elements are given a higher transmission priority than to those of higher frequencies, as base layer 210' is always transmitted. Thus, when a bit rate is below a known threshold, e.g., $R_T$, the sequence is displayed at a lower resolution. And, at higher bit rates, the sequence is displayed at the higher resolution.

Figure 8:
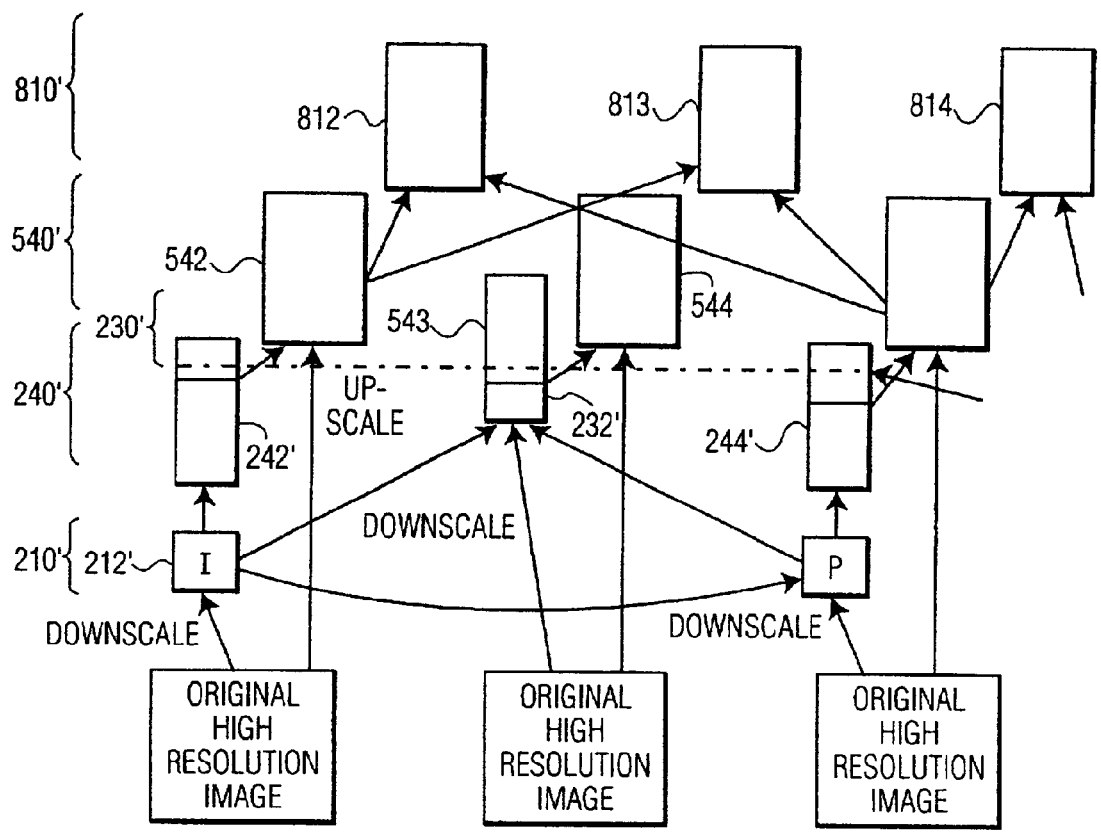
FIG. 8 illustrates a second exemplary hybrid spatial-temporal SNR FGS video encoded structure.

FIG. 8 illustrates a hybrid-spatial-temporal-SNR FGS encoding in accordance with the principles of the encoder illustrated in FIG. 4b. In this aspect of the invention, original video signal 2' is downscaled into downscaled base layer 210', containing frames 212, 214. A downscaled temporal enhancement layer 230' is generated from the data contained in frames 212, 214. A downscaled SNR enhancement layer 242' is generated from the original downscaled image and base layer 210' frame date. Spatial layer 540 is the generated from an video image reconstructed by upscaling video data information contained in corresponding frames, i.e., 212'/242', 214'/244', of base layer 210' and 240' and original video image 2'. A temporal enhancement layer 810 is then created from spatial enhancement layer frames, illustratively represented as 542, 544. Generation of temporal layer frames 812, 813, 814, etc., is similar to the generation of temporal layer frames 232', etc., and need not be discussed in detail herein.

Figure 9A:
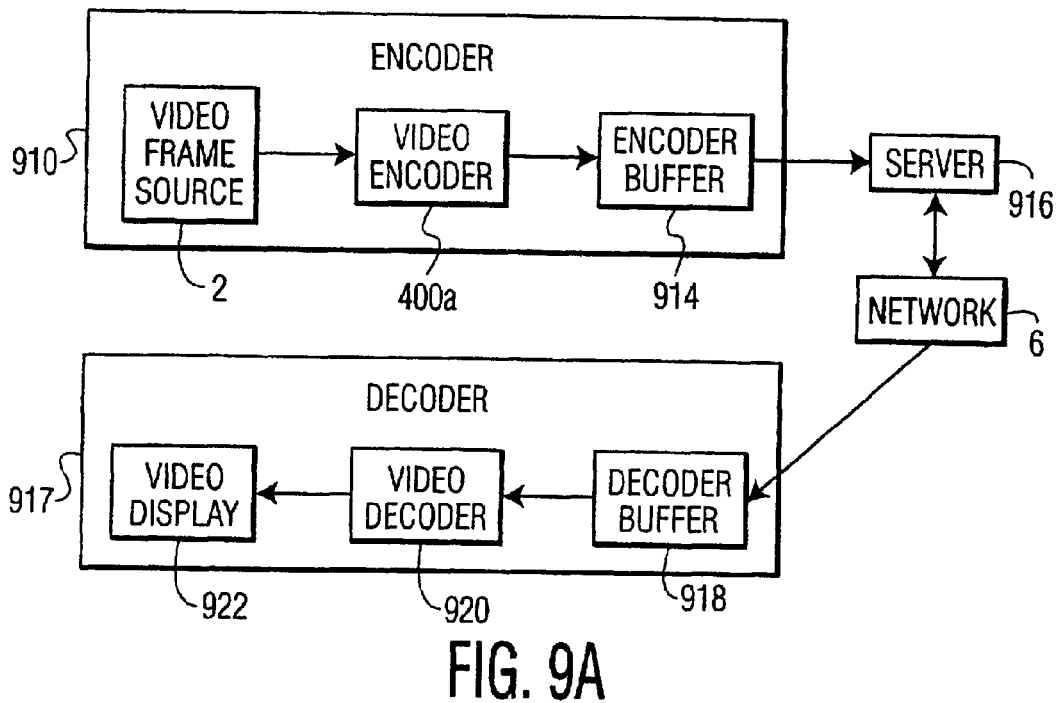
FIG. 9a illustrates an exemplary system configuration that utilizes the principles of the present invention.
Figure 9B:
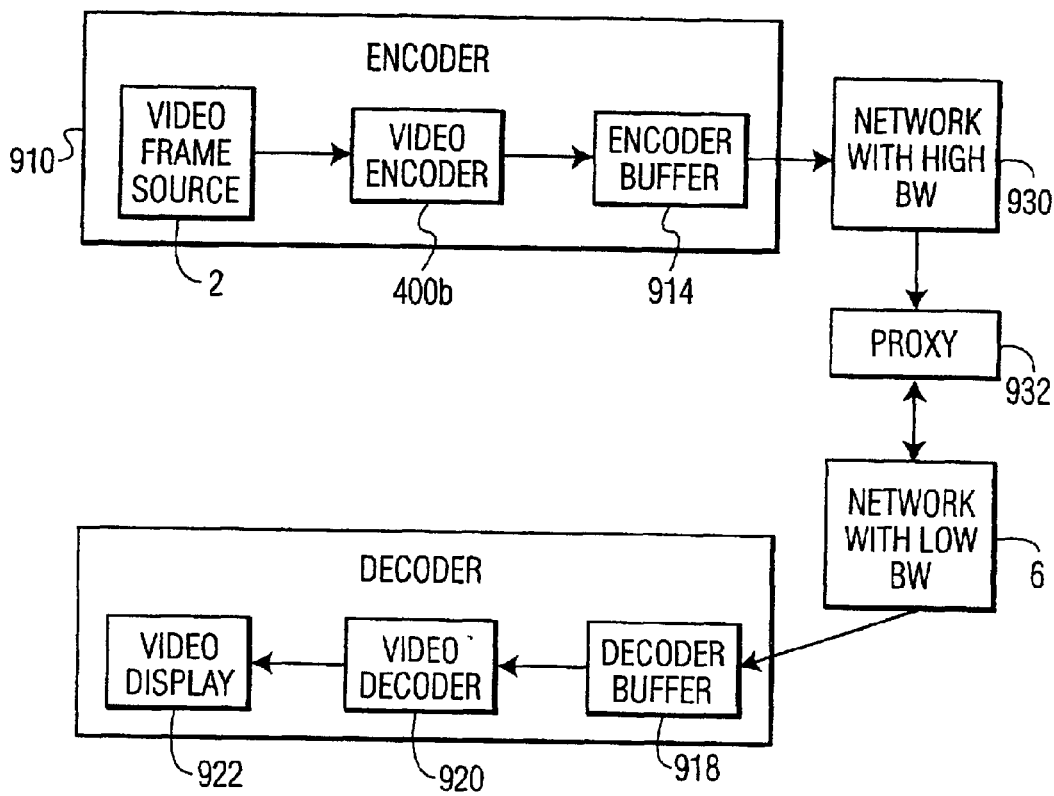
FIG. 9b illustrates a second exemplary system configuration that utilizes the principles of the present invention.

FIG. 9a illustrates an exemplary transmission system 900a utilizing the principles of the present invention. Video data is provided by video frame source 2 to video encoding unit 910. Video encoding unit 910 includes encoder 400a or 400b, similar to that illustrated in either FIG. 4a or 4b, respectively. Video encoded data is then stored in encoder buffer 914. The encoded data is then provided to server 916 which transmits a encoded base layer and portions of the encoded enhancement layer data, individually or in combination, over data network 6. At receiving system 917, the received data frames are stored in decoder buffer 918 and provided to video decoder 920. Video decoder 920 extracts and decodes the received information. The decoded information items are next presented on video display 922 or may be stored on a, not shown, video recording device, such as an analog video recorder, a digital video recorder, writeable optical medium. FIG. 9b illustrates a second exemplary transmission system utilizing the principles of the present invention. In this exemplary transmission system, the encoded data stored in encoder buffer 914 is provided to high bandwidth network 930. The high bandwidth transmitted data is then held in proxy system 932 for transmission over low bandwidth network 936 to decoder 917. At server 916 or proxy 932 a determination of the transmission bit rate may be determined based on the available bandwidth.

Figure 10:
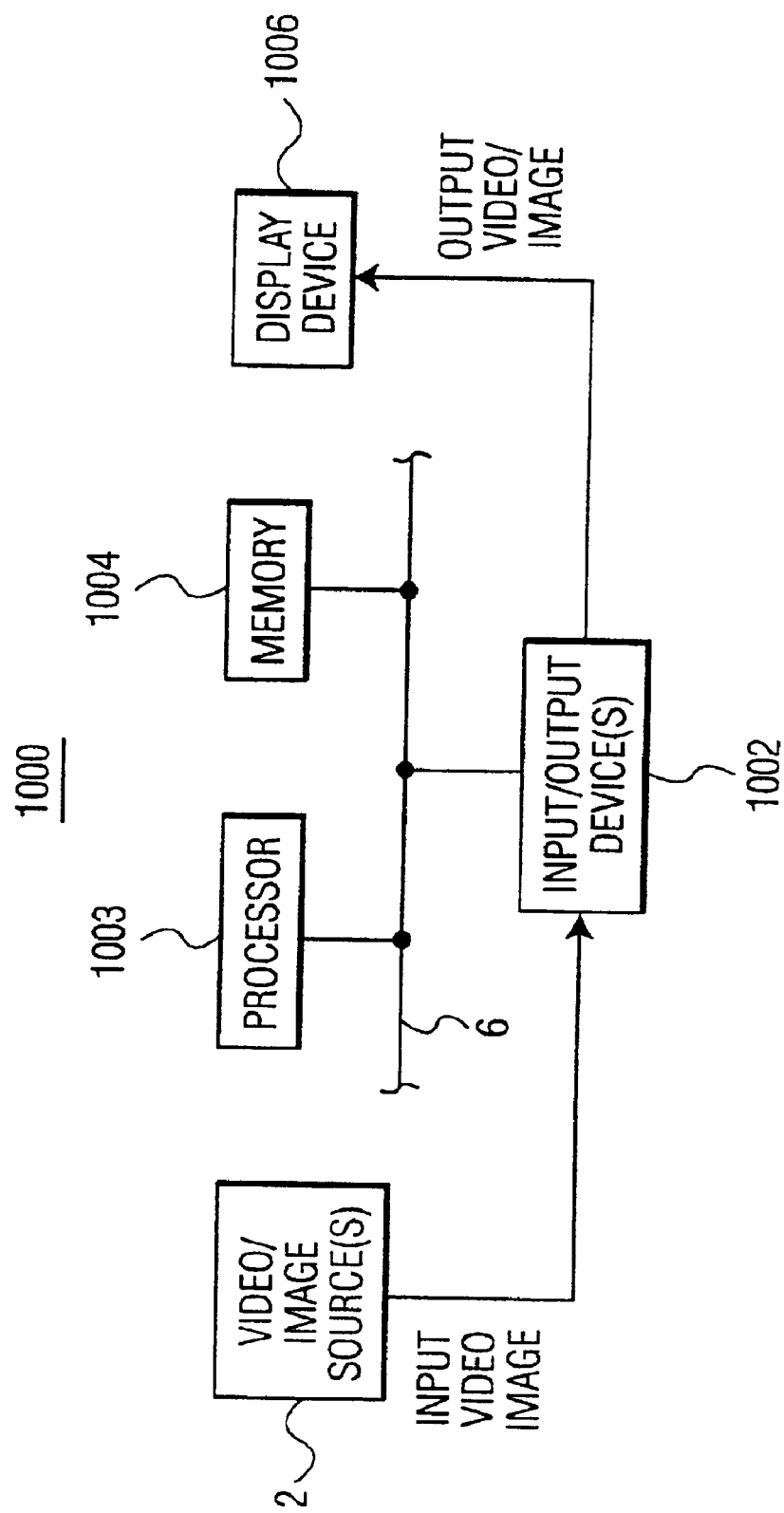
FIG. 10 illustrates an exemplary block diagram of a transmission system incorporating an encoding system in accordance with the principles of the present invention.

FIG. 10 shows an exemplary embodiment of a system 1000 which may be used for implementing the principles of the present invention. System 1000 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. System 1000 includes one or more video/image sources 2, one or more input/output devices 1002, a processor 1003 and a memory 1004. The video/image source(s) 2 may represent, e.g., a television receiver, a VCR or other video/image storage device. The source(s) 2 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 1002, processor 1003 and memory 1004 may communicate over a communication medium 6. The communication medium 6 may represent, e.g., a bus, a communication network, one or more internal connections of a circuit, circuit card or other device, as well as portions and combinations of these and other communication media. Input video data from the source(s) 2 is processed in accordance with one or more software programs stored in memory 1004 and executed by processor 1003 in order to generate output video/images supplied to a display device 1006.

In a preferred embodiment, the coding and decoding employing the principles of the present invention may be implemented by computer readable code executed by the system. The code may be stored in the memory 1004 or read/downloaded from a memory medium such as a CD-ROM or floppy disk. In other embodiments, hardware circuitry may be used in place of, or in combination with, software instructions to implement the invention. For example, the elements illustrated herein may also be implemented as discrete hardware elements.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed. Furthermore, it would be understood that reference to enhancement layer includes individual quality (SNR), temporal and spatial layers, in addition to combinations of SNR, temporal and spatial enhancement layers.

We claim:

1. A method for coding video data contained in image frames comprising the steps of:
    downscaling said video data image frames;
    encoding said downscaled video data to produce base layer frames;
    generating quality enhanced residual images from said downscaled video data and said base layer frames;
    encoding said quality enhanced residual images using a fine granular coding technique to produce quality enhancement layer frames;
    upscaling said base layer and said quality enhanced residual frames;
    generating a first set of residual images from said upscaled encoded data contained base layer, and corresponding quality enhancement layer frames and said video data;
    encoding said first set of residual images using a fine granular coding technique to produce spatial enhancement layer frames.

2. The method as recited in claim 1 further comprising the step of;
    generating a second set of residual images from said first set of residual images; and
    coding said second set of residual images using a fine granular coding technique to produce temporal enhancement layer frames.

3. The method as recited in claim 1, further comprising the step of:
    transmitting said base layer frames, and portions of said spatial enhancement frames over a variable bandwidth network.

4. The method as recited in claim 3 further comprising the steps of:
    determining an available bandwidth of said network;
    selecting the portions of said spatial enhancement layer frames to be transmitted based on said available bandwidth.

5. The method as recited in claim 3, further comprising the step of:
    transmitting portions of said temporal enhancement layer frames over a variable bandwidth network.

6. The method as recited in claim 5 further comprising the steps of:
    determining an available bandwidth of said network;
    selecting the portions of said temporal enhancement layer frames to be transmitted based on said available bandwidth.

7. The method as recited in claim 1 further comprises the step of:
    combing said quality enhancement frames and said spatial enhancement layer frames into an enhancement frame layer.

8. The method as recited in claim 7 further comprises the step of:
    transmitting said base layer frames and portions of said combined quality enhancement layer frames and said spatial enhancement layer frames over a variable bandwidth network.

9. The method as recited in claim 8 further includes determining an available bandwidth of the network; and
    selecting portions of said quality enhancement layer and portions of said spatial layer frames to be transmitted based on said available bandwidth.

10. The method as recited in claim 8 further comprises the step of:
    combing said enhancement layer frame and said temporal enhancement layer frames into a second enhancement frame layer.

11. The method as recited in claim 10 further comprises the step of:
    transmitting said base layer frames and portions of said combined quality enhancement layer frames, spatial enhancement layer frames and temporal enhancement layer frames over a variable bandwidth network.

12. The method as recited in claim 11 further includes determining an available bandwidth of the network; and
    selecting portions of said quality enhancement layer and portions of said spatial layer frames to be transmitted based on said available bandwidth.

13. The method as recited in claim 1 wherein said spatial enhancement layer frames are motion compensated.

14. The method as recited in claim 2 wherein said temporal enhancement layer frames are motion compensated.

15. A method for coding video data comprising the steps of:
    downscaling said video data;
    coding said downscaled video data to produce base layer frames;
    generating residual images from said downscaled video data and said base layer frames;
    coding said residual images using a fine granular coding technique to produce quality enhancement layer frames;
    upscaling said base layer and said quality enhancement layer frames generating a second set of residual images from upscaled base layer and said quality enhancement frames and said video data;

coding said second residual images using a fine granular coding technique to produce spatial enhancement layer frames.

16. The method as recited in claim 15 further comprising the steps of:

generating a third set of residual images from corresponding spatial layers; and coding said third set of residual images using a fine granular coding technique to produce temporal enhancement layer frames.

17. The method as recited in claim 15 wherein said spatial enhancement layer frames are motion compensated.

18. The method as recited in claim 16 wherein said temporal enhancement layer frames are motion compensated.

19. A memory medium including code for encoding video data, said code comprising:

code to downscale said video data;

code to encode said downscaled video data to produce base layer frames;

code to generate residual images from said downscaled video data and said base layer to produce quality enhancement frames;

code to upscale said base layer frames and said quality enhancement layer frames;

code to generated a second residual images from upscaled frames and said video data; and code to encode said second residual images using a fine granular coding technique to produce spatial enhancement layer frames.

20. A memory medium as recited in claim 19 further comprising:

code to generate a third residual images from said spatial enhancement frames;

code to encode said third residual images using a fine granular coding technique to produce temporal enhancement layer frames.

21. A memory medium as recited in claim 19 wherein said spatial enhancement frames are motion compensated.

22. A memory medium as recited in claim 20 wherein said temporal enhancement layer frames are motion compensated.

23. An apparatus for coding video data contained in image frames comprising:

a downscaler to downscale said video data image frames;

an encoder operable to:

encode said downscaled video data to produce base layer frames;

generate quality enhanced residual images from said downscaled video data and said base layer frames;

encode said quality enhanced residual images using a fine granular coding technique to produce quality enhancement frames an upscaler to upscale said base layer and said quality enhanced residual images;

a second encoder operable to:

generate a first set of residual images from said upscaled base layer, said upscaled residual images and said video data;

encode said first set of residual images using a fine granular coding technique to produce spatial enhancement layer frames.

24. The apparatus as recited in claim 23 wherein said second encoder is further operable to:

generate a second set of residual images from said first set of residual images; and encode said second set of residual images using a fine granular coding technique to produce temporal enhancement layer frames.

25. The apparatus as recited in claim 23, further comprising a transmitting device to transmit said base layer frames, and portions of said spatial enhancement frames over a variable bandwidth network.

26. The apparatus as recited in claim 25 further operable to:

determine an available bandwidth of said network;

select portions of said spatial enhancement frames to be transmitted based on said available bandwidth.

27. The apparatus as recited in claim 25, further operable to:

transmit portions of said temporal enhancement layer frames over a variable bandwidth network.

28. The apparatus as recited in claim 27 further operable to:

determine an available bandwidth of said network;

select portions of said temporal enhancement layer frames to be transmitted based on said available bandwidth.

29. The apparatus as recited in claim 23 further operable to:

combine said quality enhancement layer frames and said spatial enhancement layer frames into a combined enhancement layer frame.

30. The apparatus as recited in claim 29 further operable to:

transmit said base layer frames and portions of said combined enhancement layer frames over a variable bandwidth network.

31. The apparatus as recited in claim 27 further operable to:

determine an available bandwidth of the network; and select portions of said quality enhancement layer and portions of said spatial layer frames to be transmitted based on said available bandwidth.

32. The apparatus as recited in claim 30 further operable to:

combine said enhancement frame layer and said temporal enhancement layer frames into a second enhancement layer frame.

33. The apparatus as recited in claim 32 further operable to:

transmit said base layer frames and portions of said combined quality enhancement frames, spatial enhancement frames and temporal enhancement frames over a variable bandwidth network.

34. The apparatus as recited in claim 33 further operable to determine an available bandwidth of the network; and select portions of said quality enhancement layer and portions of said spatial layer frames to be transmitted based on said available bandwidth.

35. The apparatus as recited in claim 27 wherein said spatial enhancement layer frames are motion compensated.

36. The apparatus as recited in claim 28 wherein said temporal enhancement layer frames are motion compensated.

37. A method for coding video data comprising the steps of:
  downscaling said video data;
  coding said downscaled video data to produce base layer frames;
  generating residual images from among said base layer frames;
  coding said residual images using a fine granular coding technique to produce first temporal enhancement layer frames
  generating residual images from said downscaled video data and said base layer frames;
  coding said residual images using a fine granular coding technique to produce quality enhancement frames;
  upscaling said base layer and said quality enhancement layer frames
  generating a second set of residual images from said upscaled base layer and said quality enhancement layer frames and said video data;
  coding said second residual images using a fine granular coding technique to produce spatial enhancement layer frames.

38. The method as recited in claim 37 further comprising the steps of:
  generating a third set of residual images from among corresponding spatial layers; and
  coding said third set of residual images using a fine granular coding technique to produce second temporal enhancement layer frames.

39. The method as recited in claim 37 further comprises the step of:
  transmitting said base layer frames and portions of said combined quality enhancement layer frames, said spatial enhancement frames and said first temporal enhancement layer frames over a variable bandwidth network.

40. The method as recited in claim 38 further comprises the step of:
  transmitting said base layer frames and portions of said combined quality enhancement frames, said spatial enhancement frames, said first temporal and said second temporal enhancement layer frames over a variable bandwidth network.

41. The method as recited in claim 37 wherein said spatial enhancement layer frames are motion compensated.

42. The method as recited in claim 38 wherein said temporal enhancement layer frames are motion compensated.

43. A system for coding video data comprising:
  means for downscaling said video data;
  means for coding said downscaled video data to produce base layer frames;
  means for generating residual images from said downscaled video data and said base layer frames;
  means for coding said residual images to produce quality enhancement frames;
  means for upscaling said base layer and said quality enhancement frames
  means for generating a second set of residual images from upscaled base layer and said quality enhancement frames and said video data;
  means for coding said second residual images to produce spatial enhancement layer frames.

44. The system as recited in claim 43 further comprising:
  means for generating a third set of residual images from corresponding spatial layers; and
  means for coding said third set of residual images to produce temporal enhancement layer frames.

45. The system as recited in claim 43 wherein said means for coding includes FGS encoding.

46. The system as recited in claim 44 wherein said means for coding includes FGS encoding.

* * * * *